Feb. 20, 1968     R. E. SEARS     3,369,422
PRELOADED BALL NUT AND SCREW DEVICE
Filed Feb. 16, 1966     2 Sheets-Sheet 1
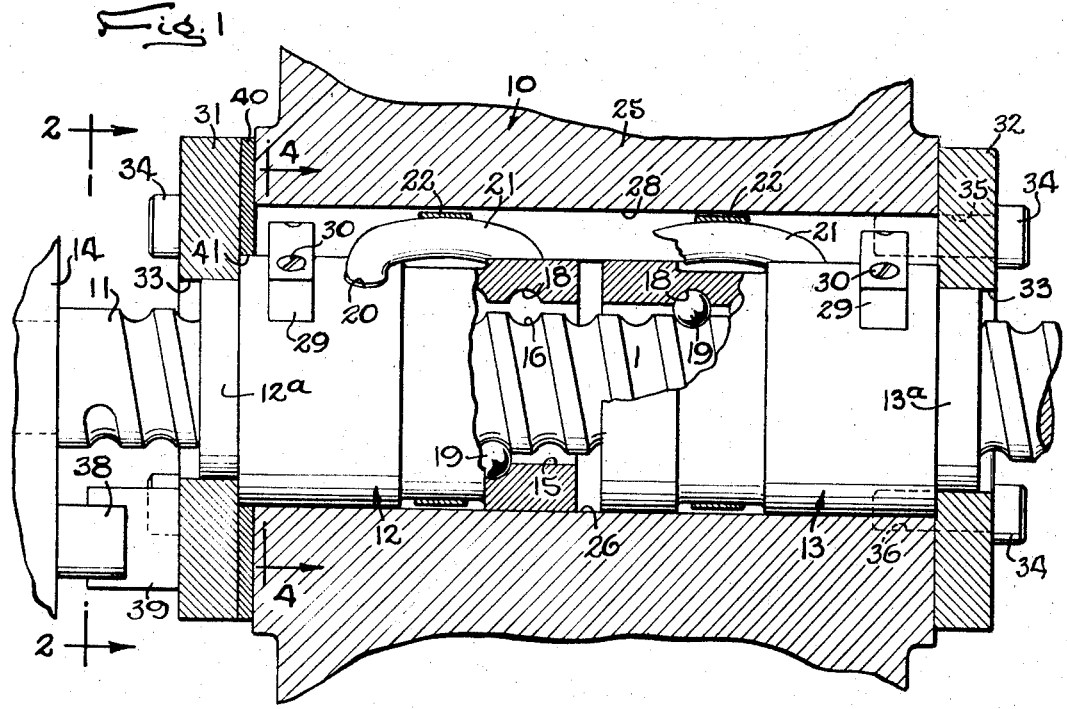
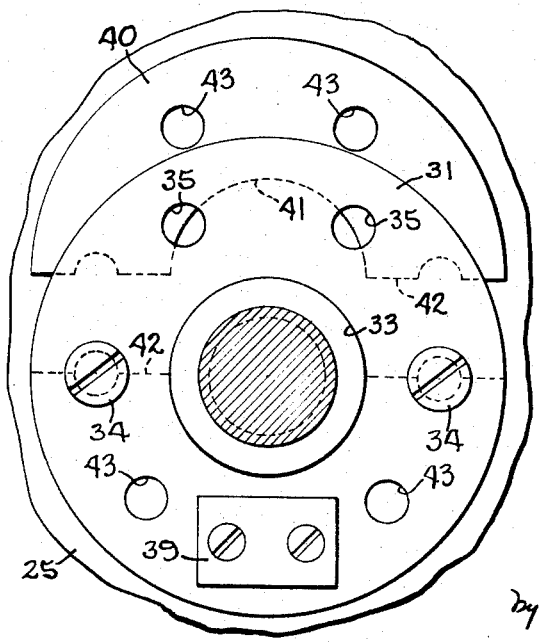
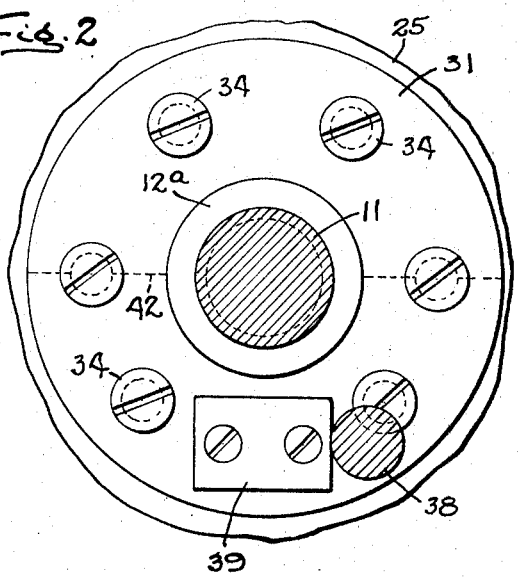
INVENTOR
Richard E. Sears
by Wolfe, Hubbard, Voit & Osann
ATTORNEYS Feb. 20, 1968 R. E. SEARS 3,369,422
PRELOADED BALL NUT AND SCREW DEVICE
Filed Feb. 16, 1966 2 Sheets-Sheet 2
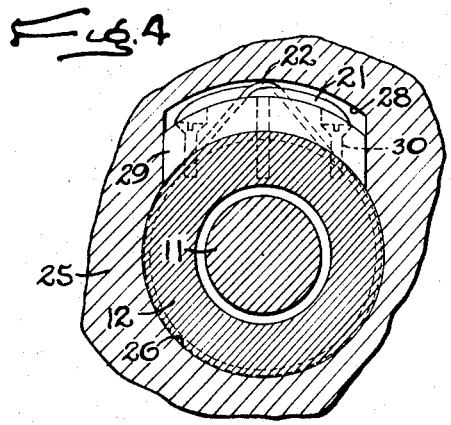
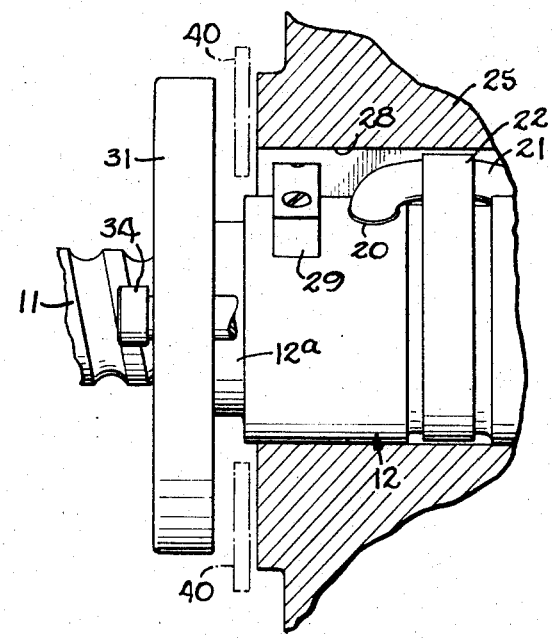
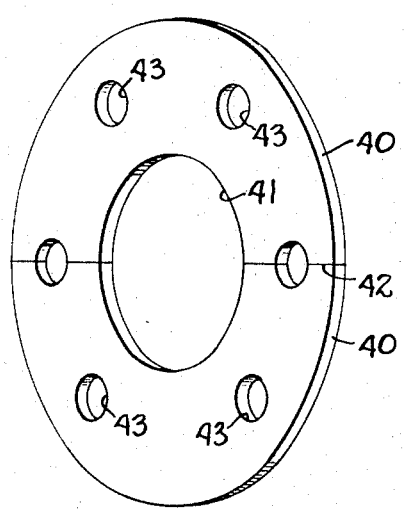
INVENTOR
Richard E. Sears
By Wolfe, Hubbard, Voit & Osann
ATTORNEYS United States Patent Office 3,369,422
Patented Feb. 20, 1968

3,369,422
PRELOADED BALL NUT AND SCREW DEVICE
Richard E. Sears, Birmingham, Mich., assignor to Beaver Precision Products, Inc., Clawson, Mich., a corporation of Delaware
Filed Feb. 16, 1966, Ser. No. 527,832
8 Claims. (Cl. 74—424.8)

ABSTRACT OF THE DISCLOSURE

For preloading a series of balls interconnecting and circulating within the raceways of a screw and a pair of ball nuts telescoped over the screw, a housing surrounds the nuts and keys the nuts against rotation relative to one another so that, when an axial force is exerted on the nuts by adjustable end plates attached to the housing, the nuts are shifted axially along the screw to preload the balls between the sides of the raceways.

---

This invention relates to a circulating ball screw and nut mechanism, and more particularly, to such a mechanism incorporating improved means for preloading the balls to eliminate play between the screw and nut and reduce the axial deflection resulting from the imposition of an external thrust load.

In ball type screw and nut mechanisms, various methods of removing play or looseness and reducing axial deflection have been devised, generally involving the use of two nuts in tandem relation on the screw and means to place the contained balls under a preload. The methods thus far devised have presented in themselves various problems of manufacture and assembly, or have not been adjustable or stable in the amount of preloading impressed on the balls.

The general object of this invention is to provide improved means which may be adjusted to preload the balls of an antifriction screw and nut mechanism the desired amount.

Another object of this invention is to provide means for preloading the balls in a ball and screw mechanism which is simple in construction and easily assembled, and which further improves the overall strength and rigidity of the circulating ball mechanism.

A further object of this invention is to provide a means for preloading the balls in a ball and screw assembly in which the preloading force on the balls is easily adjustable.

These and other objects and advantages of the invention will become apparent from the following detailed description taken in connection with the accompanying drawings, in which FIGURE 1 is a side cross-sectional view, partially broken away, of the screw and nut mechanism.

FIG. 2 is an end view along the line 2—2 of FIG. 1.

FIG. 3 is an end view similar to FIG. 2 with the spacing shim in moved position.

FIG. 4 is a cross-sectional view along the line 4—4 of FIG. 1.

FIG. 5 is a fragmentary side view, partially in cross-section, showing the end plate loosened for removal of the shim.

FIG. 6 is a perspective view of the shim.

FIG. 7 is a perspective view of the key for preventing rotation of the nut.

While the invention will be described in connection with a preferred embodiment, it will be understood that it is not intended to limit the invention thereto, but it is intended to cover all modifications and alternative constructions falling within the spirit and scope of the invention as expressed in the appended claims.

In the exemplary embodiment, a screw and nut mechanism 10 embodying the invention is shown in FIG. 1, including a feed screw 11 rigidly fixed to a rotatable collar 14 and a pair of nuts 12 and 13 which are threaded on the screw in spaced relationship for longitudinal movement along the screw as the latter is turned. The assembly may be used in a machine tool (not shown) wherein the feed screw is rotated to move the nuts which position a work table. In other embodiments, the nuts could be rotated to advance the feed screw with equally beneficial results from the invention.

To advance each nut as the feed screw is turned, the screw is inserted through an internal bore 15 in the nut sized to loosely receive the screw, with grooves 16 and 18 machined in the adjacent surfaces of the screw and nut bore, that is, the outside surface of the screw and the bore wall, to form a race in which is constained a train of balls 19. As the screw is turned, the balls roll along the race to advance the nut along the screw. The balls ride in the groove 18 in the bore until they reach an opening 20 extending outwardly through the nut in a direction tangent to the ball race. The openings 20 aline with a deflecting means (not shown) of a type which directs the balls therein and connects the groove ends with a return tube 21 held on the nut by a strap 22. As the nut advances along the screw, the balls are returned to the leading end of the circuit through the return tube when they reach the end of the groove 18. The raceways 16 and 18 combined with the recirculation tube 21 form a closed circuit path for the bearing balls as is well known in the art.

In accordance with the present invention, means are provided for impressing a force at the outside ends of each nut in a direction to urge the nuts axially while limiting relative rotation between the nuts to cause the balls to be squeezed between opposing sides of the grooves forming the respective races and prevent play from existing between the nuts and screw. The force exerting means places the nuts and screw both in either a tensive or a compressive load and is incorporated in a housing supporting the movable work table for exerting the force on the outer ends of the tandem spaced nuts to urge them towards each other or apart for preloading the balls between the sides of the ball race formed in the nuts and those sides formed in the screw. A keyway in the housing adjacent the nuts is provided for receiving both the return tubes on each nut and a key fixed to each nut fitting into the keyway to limit relative rotation of the nuts while permitting them to move axially relative to one another.

In the embodiment of the invention shown, the means for exerting a force on the nuts is incorporated in a housing 25 attached to the work table to be removed. This housing includes a bore 26 (see FIGS. 1 and 4) which is large enough to receive the pair of nuts 12 and 13 mounted on the screw as heretofore described. The return tubes 21 are amply accommodated by a keyway 28 in the housing and are protected from contact with keyway 28 by a key 29 (see FIGS. 4 and 7) fastened near outer end of each nut by screws 30 passing through holes in the key. The key limits rotation of the nut within the bore 26. With this construction the mechanism may be assembled by positioning the nuts end to end on the screw, inserting the balls in the nuts through the openings 20 and into the return tubes, strapping the return tubes on the nuts and slipping the assembly into the housing portion of the device. In addition to preventing rotation of the nuts in the housing, the keys in extending radially and angularly around the nuts serve to protect the return tubes from contacting the keyway walls during the insertion of the ball nuts into their confining of the mechanism housing and during any adjustment of preload.

The means for exerting an axial force on the nuts comprises a pair of end plates 31 and 32 (see FIGS. 1-3) attached to opposite ends of the housing 25 by six cap screws 34 passing through holes 35 in the end plates and received in threaded openings 36 in the end of the housing. These end plates are annularly shaped with the center opening 33 being large enough to receive conventional ball thread wipers 12a and 13a adjacent the ends of the nuts. The axial length of the housing is slightly less than the distance between the outside ends of the spaced nuts such that, when the end plates are attached thereto, they contact the ouside ends of the nuts before they are drawn flat against the ends of the housing by the tightening of the cap screws. Tightening these cap screws to draw the end plates snugly against the end of the housing causes the plates to press the nuts towards each other on the screw to move the opposite sides of the grooves 16, and 18 towards each other and constrain the balls tightly in the race. This places the nuts and the included screw portion under a compressive force. Placing both the nuts and the screw under similar loading conditions adds more rigidity to the mechanism since this causes the load supported by the balls along the ball nut body to be more evenly distributed. For instance, if a force is exerted on the outer ends of the nuts tending to pull them apart, both the nuts and screw will be placed under a tensive force again producing matching deflection of the screw and ball nut bodies.

Since the return tubes and keys are positioned in the axial extending keyway, the nuts are prevented from rotating in the housing bore but may move axially under the force exerted by the end plates until the balls contact the opposite sides of the grooves 16 and 18 under the preloading force. The spacing between the nuts must be slightly greater than the small axial movement of both nuts necessary to bring the balls of each into contact with the sides of the grooves. Dog stops 38 and 39 attached to the rotatable collar 14 and the end plate 31 respectively (see FIGS. 1 and 2), are positioned to contact and stop axial travel of the mechanism by limiting angular travel of the collar and ball screw relative to the ball nut, thus transferring the impact torque directly to the housing 25 rather than feeding it through a path comprising the ball screw, the bearing balls, the ball nut, the key and the means securing the key to the ball screw.

To permit adjustment of the amount of force exerted on the outside ends of the nuts when the end plates are tightened down, and thereby adjust the amount of preloading exerted on the assembly, means may be provided to vary the distance between these end plates. In the embodiment shown this means includes a shim 40 positioned between the end plate 31 (see FIGS. 1, 3 and 6) and the end of the housing. The shim 40 is an annularly shaped plate with a center opening 41 of approximately the same size as the bore 26 to fit around the outside diameter of the nuts. The shim is divided into two symmetrical pieces along a diameter line 42 and includes six holes 43 through which the cap screws may pass for fastening the end plate on the housing. Two of these holes preferably are centered on the diameter line 42 along which the shim is divided so that the shim pieces may be removed after taking out only four of the six cap screws as illustrated in FIG. 5. The shim may thus be removed and replaced with similar shims of less or greater thickness without separating the feed screw and nuts, and even without completely removing the end plates. In most instances, removal after installation will be for the purpose of increasing the preloading of the nuts since, due to wear of the grooves and balls, the preloading may decrease slightly with use. Since the shims are positioned outside the ends of the housing, they need only be machined to a lesser thickness and reinserted to increase the preloading on the system.

From the foregoing, it will be apparent that the housing 25 itself constrains the nuts 12 and 13 against relative rotation not only when the nuts are being shifted axially to preload the balls 19 but also during such time as the nuts are producing relative drive of the screw. Thus, there is no need to rely on structure externally of the housing to produce the constraint required for preloading and, as a result, the nuts can be threaded onto the screw, inserted into the housing and preloaded to a predetermined degree before the housing is attached to the work table of the machine. This enables preloading and assembly of the nuts and the screw as a package at their place of manufacture and before shipment to their place of ultimate use.

I claim as my invention:

1. In a circulating ball mechanism, a screw having a helical groove extending therealong, a pair of nuts positioned end to end with their juxtaposed ends spaced slightly apart and each having a bore extending therethrough sized to loosely receive said screw, a helical groove in the wall of each bore terminating short of the end of the nut and of the same lead as said screw helical groove to form therewith a ball race, a train of balls constrained in said race and interlocking said nut and screw such that said screw is relatively advanced through said nut bore when rotated relative thereto, a return tube supported on the outside of each nut and connecting the ends of the grooves of that nut to return the balls to the opposite end of the groove as the screw is turned, a housing including a bore sized to fit around said nuts and having a length along the bore axis less than the distance between the outside ends of said spaced nuts, a keyway in said housing opening into said bore for receiving said return tubes when the nuts are positioned in said bore, a key attached to each nut and adapted to interfit with said keyway and restrict rotation while permitting axial movement of said nuts in said housing bore, a pair of end plates adapted to be attached to the ends of said housing and extend across a portion of said housing bore to contact the adjacent outer ends of said nuts and force the nuts together to preload the balls in said races, and shim means for spacing one of said end plates from the supporting end of said housing to control the spacing between the end plates and thereby determine the maximum amount of preload thus making the magnitude of the preload substantially independent of the tightening of the screws holding the end plates to the housing.

2. In a circulating ball mechanism, a screw having a helical groove extending therealong, a pair of nuts positioned end to end with their juxtaposed ends spaced slightly apart and each having an alined bore extending therethrough sized to loosely receive said screw, a helical groove in the wall of each bore terminating short of the end of the nut and of the same lead as said screw helical groove to form therewith a ball race, a train of balls constrained in said race and interlocking said nuts and screw such that said screw is relatively advanced through said nut bores when rotated relative thereto, a return tube connecting the opposite ends of the grooves of each nut to return the balls to the groove as the screw is turned, a housing including a bore sized to fit around said nuts and screw and having a length along the bore axis slightly less than the distance between the outside ends of said spaced nuts, locking means to restrict rotation of said nuts in said bore while permitting axial movement relative thereto, a pair of end plates including means for attaching each to an end of said housing to extend across a portion of said housing bore and contact the adjacent outer ends of said nuts to force each nut towards the other on the screw and preload the balls in said races, and shim means for spacing one of said end plates from said housing end to control the distance between the end plates and thereby limit the force exerted on the nuts preloading the balls in said races.

3. In a circulating ball mechanism, a screw having a helical groove extending therealong, a pair of nuts positioned end to end with their juxtaposed ends spaced slightly apart and each having a bore extending therethrough sized to loosely received said screw, a helical groove in the wall of each bore terminating short of the end of said nut end of the same lead as said screw helical groove to form therewith a ball race, a train of balls constrained in said race and interlocking said nuts and screw such that said screw is relatively advanced through said nut bores when rotated relative thereto, a return tube supported on the outside of each nut and connecting the ends of the groove of that nut to return the balls to the opposite end of the groove as the screw is turned, a housing including a bore sized to fit around said nuts, said housing also including a keyway opening into said bore for receiving said return tubes when said housing is fit over said nuts, a key attached to each nut and adapted to interfit within said keyway to restrict rotation while permitting axial movement of said nut relative to said housing bore, an annular shaped end plate attached by screws on each end of said housing adjacent said bore and having a center opening through which said screw passes of a lesser diameter than the outside diameter of said nuts to thereby contact and exert a force on the outer end of the adjacent nut when tightened against the housing end tending to force each nut into said housing bore whereby by adjusting said end plate on said housing the force exerted on said nuts may be varied to preload the balls in said races.

4. In a circulating ball mechanism, a screw having a helical groove extending therealong, a pair of nuts positioned end to end with their inboard ends spaced slightly apart and each having a bore extending therethrough sized to loosely receive said screw, a helical groove in the wall of each bore of the same lead as said screw helical groove and forming therewith a ball race, a train of balls constrained in each race and interlocking said nuts and screw such that said screw is relatively advanced through said nut bores when rotated relative thereto, a return tube supported to extend along the outside of each nut and connecting the ends of the grooves of that nut to return the balls to the other end of the respective groove as the screw is turned, a housing having a bore sized to fit around said nuts and having ends disposed near the outboard ends of said nuts and constantly maintained in fixed angular positions relative to one another, said housing including a keyway opening into said bore to receive said return tubes, a key fastened to each nut and interfitting within said keyway to restrict rotation of that nut within said housing bore both when said screw is stationary relative to said nuts and when said screw is being rotated relative to said nuts, said keys and said keyway also cooperating to restrict rotation of said nuts relative to each other, clamping means supported from said housing and adapted to exert an axial directed force on the outer end of each nut tending to urge each nut axially relative to the other, and means to adjust the force exerted on said nuts and thereby adjust the preload on said balls in said races.

5. In a circulating ball mechanism, a screw having a helical groove extending therealong, a pair of nuts positioned end to end with their inboard ends spaced slightly apart and each having a bore extending therethrough sized to loosely receive said screw, a helical groove in the wall of each bore of the same lead as said screw helical groove and forming therewith a ball race, a train of balls in said race interlocking said nuts and screw such that said screw is relatively advanced through said nut bores when rotated relative thereto, a return tube connecting the ends of the groove in each nut and supported on the outer surface of each nut to return the balls to the other end of the respective groove in each nut as the screw is turned, a housing having a bore sized to fit around said nuts and having ends disposed near the outboard ends of said nuts and constantly maintained in fixed angular positions relative to one another, said housing bore including a keyway positioned to receive said return tubes, a key fastened to each nut and interfitting within said keyway to restrict rotation of that nut within said housing bore both when said screw is stationary relative to said nuts and when said screw is being rotated relative to said nuts, and clamping means supported from said housing for exerting a force on said nuts tending to force said nuts axially relative to each other and thereby preload said balls in said races.

6. A mechanism as defined in claim 5 in which each of said return tubes extends around its respective nut through a predetermined angular distance, and each key extends around its respective nut through a greater angular distance to prevent said return tube from engaging said keyway.

7. In a circulating ball mechanism, a screw having a helical groove extending therealong, a pair of nuts positioned end to end with inboard ends spaced slightly apart and each having a bore extending therethrough sized to loosely receive said screw, a helical groove in the wall of each bore of the same lead as said screw helical groove and forming therewith a ball race, a train of balls in said race interlocking said nuts and screw such that said screw is relatively advanced through said nut bores when rotated relative thereto, a return tube connecting the groove in each nut at spaced points along the nut and supported on the outer surface of each nut to return the balls towards the other end of the nut as the screw is turned, a housing having a bore sized to fit around said nuts and having ends disposed near the outboard ends of said nuts and constantly maintained in fixed angular positions relative to one another, said housing bore including a keyway positioned to receive said return tubes, a key fastened to each nut and interfitting within said keyway to limit rotation of that nut within said housing bore both when said screw is stationary relative to said nuts and when said screw is being rotated relative to said nuts, and means supported from said housing for exerting an axially directed force on the outer ends of said nuts in opposite axial directions along the screw to move said nuts axially and thereby preload said balls in said races.

8. In a circulating ball mechanism, a screw having a helical groove extending therealong, a pair of nuts each having a bore extending therethrough sized to loosely receive said screw, a helical groove in the wall of each bore of the same lead as said screw helical groove and forming therewith a ball race, a train of balls in each race interlocking said nuts and screw such that said screw is relatively advanced through said nut bores when rotated relative thereto, a unitary housing surrounding said nuts and having opposite ends constantly maintained in fixed angular positions relative to one another, said housing including means within the housing for restricting rotation of said nuts relative to each other and for restricting rotation of said nuts within said housing both when said screw is stationary relative to said nuts and when said screw is being rotated relative to said nuts, and adjustable means supported from said housing and adapted to exert an axial force said nuts in opposite axial directions tending to force the nuts axially along the screw to preload said balls in each race.

References Cited

UNITED STATES PATENTS

| | | | |
|---|---|---|---|
| 1,645,276 | 10/1927 | Burns | 74—441 |
| 1,119,705 | 6/1938 | De Vlieg | 74—441 |
| 2,734,394 | 2/1956 | Chauyel | 74—441 |
| 2,959,976 | 11/1960 | Zankl | 74—441 |
| 2,978,920 | 4/1961 | Sears et al. | 74—441 |
| 3,059,494 | 10/1962 | Grabowski et al. | 74—441 |
| 3,124,969 | 3/1964 | Grabowski et al. | 74—441 |

ROBERT M. WALKER, *Primary Examiner.*

DONLEY J. STOCKING, *Examiner.*

L. H. GERIN, *Assistant Examiner.*